No. 884,673. PATENTED APR. 14, 1908.
F. LOTTER.
BEET TOPPING AND HARVESTING MACHINE.
APPLICATION FILED FEB. 16, 1907.
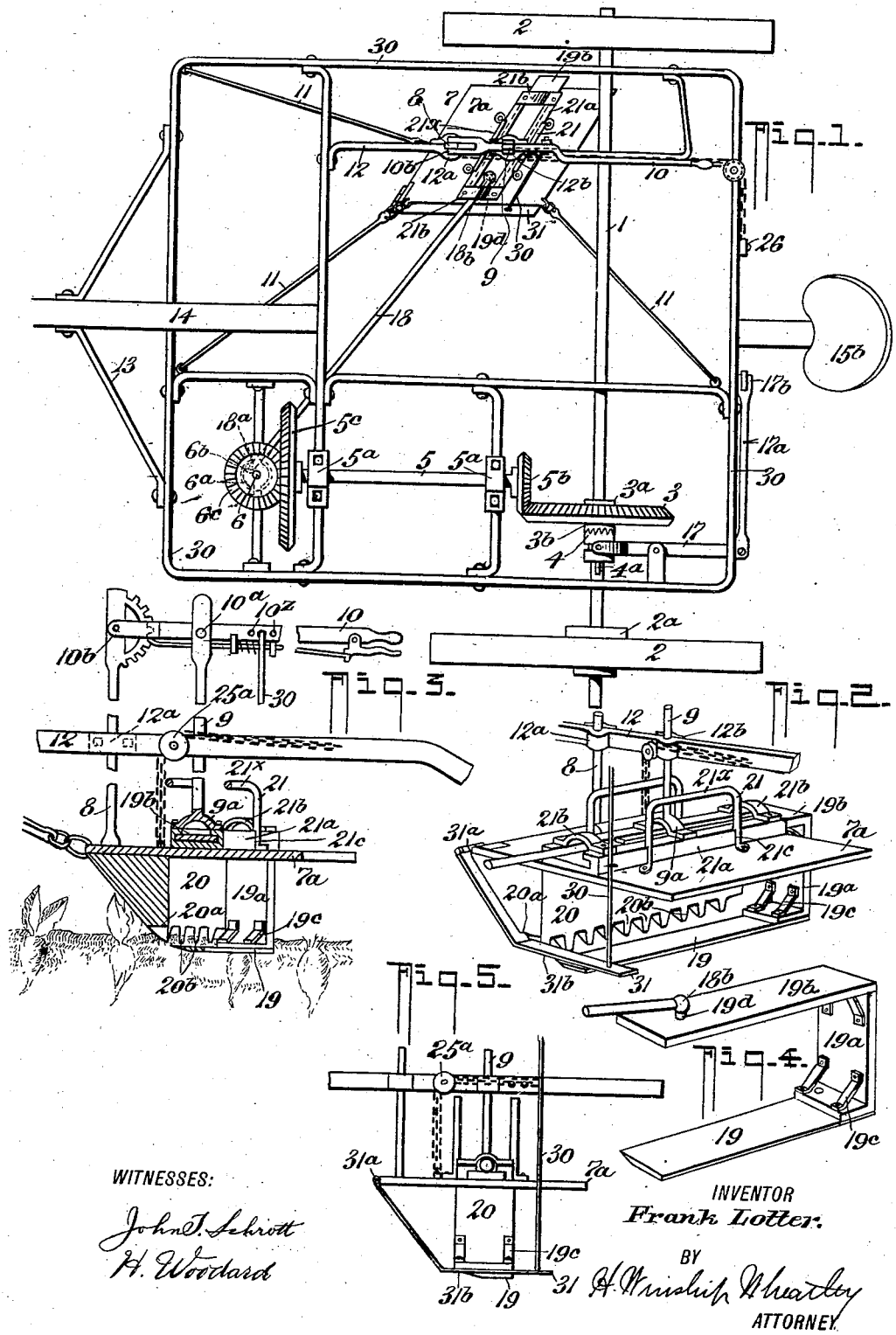
WITNESSES:
John T. Schrott
H. Woodard
INVENTOR
Frank Lotter.
BY
H. Winship Wheatley
ATTORNEY

UNITED STATES PATENT OFFICE.

FRANK LOTTER, OF ELKTON, MICHIGAN.

BEET TOPPING AND HARVESTING MACHINE.

No. 884,673.      Specification of Letters Patent.      Patented April 14, 1908.

Application filed February 16, 1907. Serial No. 357,686.

*To all whom it may concern:*

Be it known that I, FRANK LOTTER, residing at Elkton, in the county of Huron and State of Michigan, have invented certain new and useful Improvements in Beet-Topping Machines, of which the following is a specification.

My invention relates to certain new and useful improvements in beet topping machines, and in its generic nature comprises a beet topping device of the general type disclosed in my Patent, #859,958, of July 16, 1907, and in its more subordinate nature my invention embodies certain improvements on the beet topper disclosed in my patent aforesaid.

In its more specific nature my improved invention comprises certain novel construction, combination and arrangement of parts, all of which will be first described in detail, and then specifically pointed out in the appended claims, reference being had to the accompanying drawings, in which:—

Figure 1, is a top plan view of a machine embodying my invention. Fig. 2, is an enlarged detail perspective view of a knife and shoe mechanism. Fig. 3, is a vertical, longitudinal section of my invention. Fig. 4, is a detail perspective view of the knife. Fig. 5, is a side elevation of the knife and shoe mechanism.

Referring now to the accompanying drawings, in which like letters and numerals of reference indicate like parts in all of the figures, 1 designates the main drive shaft which is mounted in suitable bearings in the supporting frame 30, which frame is constructed of any suitable material, such as iron, steel or wood, but preferably of steel. The main drive shaft 1 carries a pair of drive wheels 2, similar in form to the ordinary mower wheels, and the wheels 2 are provided with an inside hub and ratchet as shown in my patent aforesaid.

One of the drive wheels 2, preferably the right hand wheel, is stationary on the end of the shaft 1, while the other wheel 2 is adjustable along the shaft to correspond to the width of the rows. The construction of the frame 30 and the arrangement of the drive wheels and drive shaft may be similar to those disclosed in my patent aforesaid.

A bevel cog wheel 3 is mounted to loosely turn on the shaft 1 and held in place by a collar $3^a$, a clutch face $3^b$ being provided to coöperate with the sliding clutch 4 that is mounted on the shaft 1 to turn therewith, by screw-keys or splines $4^a$. The clutch 4 is shifted by a clutch lever 17 under control of the operator, through the medium of the operating lever $17^b$ and the connecting rod $17^a$, it being understood that the operating lever $17^b$ may be disposed adjacent the operator's seat $15^b$ which is secured to the main frame of the machine in any desired position.

A counter-shaft 5 is mounted to lie in a horizontal plane in bearings $5^a$ of the main frame of the machine and the shaft 5 carries a cog pinion $5^b$ at one end that meshes with the cog wheel 3, and at the other end the shaft 5 has a cog wheel $5^c$ to mesh with the pinion or cog $6^c$ carried on the upper end of a vertical shaft 6, which passes through bearings $6^a$ and carries a wrist pin $6^b$ at its lower end. The wrist pin $6^b$ is preferably formed with a ball head to receive the socket end $18^a$ of a pitman 18, that operates the topping knife, as will be hereinafter again referred to.

7 designates the cutting mechanism of the machine, which consists of a diamond shaped flat plate $7^a$ of any approved size, to the underside of which a V-shaped shoe 20 having a flattened heel portion $20^a$, at its lower end, is secured. A series of ribs $20^b$ project in vertical planes from the heel portion $20^a$ and lie spaced apart from one another. The shape of the shoe 20 permits the whole plate $7^a$ to rise over the beets. The cutting mechanism of the machine also includes a cutter knife 19 which is secured at one end to the upright support $19^a$, that in turn is secured to a slide $19^b$ which lies parallel with the knife 19, suitable braces $19^c$ being provided to give strength to the construction of the knife. Near one end, the slide $19^b$ has a pin $19^d$ whose end is formed into a ball to coöperate with the socket $18^b$ of the pitman 18, whereby the movement of the pitman will be imparted to the knife.

The knife 19 has its slide $19^b$ mounted in slideways $21^a$ which are connected together by a bridge member $9^a$, to which the knife adjusting rod 9 is secured. The slideway $21^a$ is also braced near its ends by bridges $21^b$ so as to form a rigid support. The slideway $21^a$ has grooves $21^c$ to receive the vertical supports 21 which are mounted at each side of the slideway on the top of the plate $7^a$ and form a guide along which the slideway $21^a$ can be vertically adjusted to vertically adjust the knife 19, independently of the plate 7ª. Brace beams 21ˣ are provided for the vertical posts on the supports 21.

An upright shoe guide 8 is rigidly secured at the bottom portion to the top plate 7ª directly over the shoe 20, the guide 8 passing through a bearing 12ª in a bridge member 12 that is carried by the main frame of the machine. The adjusting rod 9 also passes through bearings 12ᵇ on the bridge member 12 and is pivotally connected at 10ª to the adjusting lever 10 whose end 10ᵇ is connected to the upright guide 8. Stay rods 11 are secured to the plate 7ª, at suitable intervals and at suitable points to the main frame of the machine. A tongue 14 is secured to the main frame of the machine and supported by braces 13 and may carry the usual doubletree.

All of the foregoing construction is similar to that disclosed in my patent aforesaid, but in my present invention I secure a supplemental shoe 31 to the main or primary shoe 20 by a hinge joint 31ª at the point end of the shoe 20, the supplemental shoe being shaped in side elevation the same as the main or primary shoe and the supplemental shoe 31 has a flat portion 31ᵇ corresponding to the flattened portion 20ª of the shoe 20 and is connected through the medium of a rod 30 to the adjusting lever 10, a series of apertures 10ᶻ being provided to permit the rod 30 being adjusted.

When the machine is to be moved from place to place, or at any time when not working the entire cutting mechanism may be raised from the ground through the medium of the chain 25 secured to the plate 7ª and passed over idler pulley 25ª on the bridge 12 and operated by a hand lever 26 secured adjacent the operator's seat 15ᵇ.

The manner of operation of the topping mechanism is similar to that disclosed in my patent hereinbefore referred to, and a repetition of such operation in this specification is thought to be unnecessary, as the same will be readily apparent from the foregoing specifications taken in connection with the accompanying drawings and with the aforesaid patent.

What I claim is:—

1. A beet topping machine comprising a supporting frame, a cutting mechanism mounted thereon, said cutting mechanism comprising a top plate, a shoe secured to the underside thereof, a cutting knife slidably held on said plate, means for reciprocating said cutting knife, and a supplemental shoe coöperatively secured adjacent the first mentioned shoe, substantially as shown and described.

2. A beet topping machine comprising a supporting frame, a cutting mechanism mounted thereon, said cutting mechanism comprising a top plate, a shoe secured to the underside thereof, a cutting knife slidably held on said plate, means for reciprocating said cutting knife, and a supplemental shoe coöperatively secured adjacent the first mentioned shoe, and means for adjusting said shoes, substantially as shown and described.

FRANK LOTTER.

Witnesses:
W. L. Doyle,
J. H. Sly.